United States Patent [19]
Kitajima et al.

[11] 3,737,041
[45] June 5, 1973

[54] FILTER PRESS

[75] Inventors: Susumu Kitajima; Katsutami Shibasaki, both of Osaka, Japan

[73] Assignee: Kurita Machinery Manufacturing Company, Limited, Osaka, Japan

[22] Filed: Dec. 20, 1971

[21] Appl. No.: 209,906

[52] U.S. Cl. ........................... 210/228, 210/350
[51] Int. Cl. .................................... B01d 25/00
[58] Field of Search ............ 210/224–231; 100/198

[56] References Cited

UNITED STATES PATENTS

| | | |
|---|---|---|
| 3,655,056 | 4/1972 | Schotten ........................ 210/227 |
| 2,989,187 | 6/1961 | Demeter ......................... 210/227 |
| 2,300,924 | 11/1942 | Hunziker ....................... 210/227 |

Primary Examiner—Samih N. Zaharna
Assistant Examiner—T. A. Granger
Attorney—Donald E. McCarthy, George A. Depaoli, William E. O'Brien et al.

[57] ABSTRACT

A pressing fluid chamber to be supplied with a pressure fluid is formed between each stretchable airtight sheet having a filtering face and each core plate covered with the sheet to squeeze cake in a filtering chamber by inflating the sheet. A filtrate discharge channel in the core plate communicates with an opening in the filtering face of the sheet at the portion where the sheet is prevented from inflation by the adjacent filter plate to permit filtrate to directly flow into the filtrate discharge channel through the opening.

3 Claims, 7 Drawing Figures

FILTER PRESS

BACKGROUND OF THE INVENTION

The present invention relates to improvements in a filter press provided with primary filtering means including a filtering medium and secondary filtering means for removing a liquid from filter cake by squeezing with a fluid pressure which cake is deposited within filtering chambers by the primary filtering means.

The filter press of such type has filtering chambers for filtering a supplied prefilt and pressing fluid chambers adjacent the filtering chambers and acting to reduce the volume of the filtering chambers for a squeezing operation, and the filtering chambers communicate with channels for charging the prefilt and discharging a filtrate, while the fluid chambers communicate with channels for charging the pressure fluid and discharging the same. Thus, many fluid passages or channels have to be formed in the filter press. Furthermore to ensure primary and secondary filtering operations, the channel for charging a prefilt, channels for charging and discharging a pressure fluid and channels for discharging a filtrate have to be independent of each other, so that piping for the formation of these channels and additional arrangements for assuring sealing become complex and require very complicated manufacturing steps. Particularly in a filter press wherein an airtight sheet providing a filtering face to permit the flow of the filtrate and made of a stretchable material such as a rubber is disposed over the entire surface of each core plate, with a chamber formed between the core plate and the sheet so as to force a fluid into the chamber and thereby inflate the sheet for a squeezing operation, difficulties are encountered in sealing the fluid chamber and a filtrate discharge channel in the core plate against each other if it is attempted to make the opening of the discharge channel communicate the exterior of the sheet to guide the filtrate on the filtering face of the sheet into the discharge channel.

SUMMARY OF THE INVENTION

An object of this invention is to extremely simplify the construction of a filtrate discharge channel while keeping the filtrate discharge channel completely independent of a pressing fluid chamber.

Another object of this invention is to remove a liquid from the cake deposited in the filtering chamber by a squeezing operation with an improved efficiency and to permit the filtrate to flow out of the filtering chamber with greater ease.

The present invention provides a composite filter plate comprising airtight sheets and a core plate with pressing fluid chambers formed between the sheets and the plate, the airtight sheet being made of a stretchable material such as rubber and providing a filtering face formed with numerous protrusions for permitting the flow of a filtrate, the core plate being formed on each of its front and rear faces with a picture frame-like projecting edge along its periphery and having a recessed plane defined by the projecting edge. At a suitable portion of the projecting edge there is formed a filtrate discharge channel extending from the front face to the rear face and communicating with a main filtrate discharge channel formed at a side portion of the core plate. A channel for supplying a pressure fluid into the pressing fluid chambers is also provided in the core plate which has openings in the recessed planes of the core plate.

The airtight sheet has its peripheral portion fitted to the end face of the peripheral projecting edge of the core plate, with its inner side extending along the recessed plane to form the pressing fluid chamber therebetween. The sheet has an opening communicating with the filtrate discharge channel at the portion providing the filtering face and in engagement with the peripheral projecting edge. At this portion the sheet is prevented from inflation by the adjacent single filter plate.

The filtering chamber is defined by the composite filter plate and a single filter plate adjacent the composite filter plate. The single filter plate is formed, along the periphery of each of its front and rear faces, with a picture frame-like projecting edge corresponding to the projecting edge of the core plate of the composite plate. The inner recessed side face surrounded by the projecting edge has numerous protrusions and serves as a filtering face for permitting the flow of the filtrate. The single plate further includes a filtrate discharge channel having openings in the filtering faces and communicating with a main filtrate discharge outlet formed in a side portion of the single plate.

Each of the composite filter plate and single filter plate is covered with a sheet of filter medium such as filter fabric.

Thus, the composite plates and single plates are arranged side by side and pressed together and a prefilt to be filtered is supplied into the filtering chambers formed therebetween, whereby a filtrate passes through the filter medium, along the filtering faces of the plates, leaving a cake in the filtering chambers which still contains much filtrate. Accordingly, a pressure fluid is charged into the pressing fluid chamber to inflate the airtight sheet, to reduce the volume of the filtering chamber and to thereby squeeze the cake for the removal of the liquid. It is further possible to effect the squeezing operation while introducing the prefilt into the filtering chambers. If the pressure fluid is applied with a varying pressure during the squeezing operation to give vibration to the filtering chambers, the filter medium will be prevented from clogging for improved removal of the liquid.

During operation, the airtight sheet is clamped at its peripheral portion with the projecting edges of the core plate and that of the single plate, while the opening portion thereof communicating with the filtrate discharge channel is prevented by the projecting edge of the adjacent single plate in contact therewith in spite of inflation of the other portion of the sheet under the action of the pressure fluid. Accordingly, at the opening portion, the peripheral edge of the airtight sheet and the peripheral edge of the core plate are kept in snug-fit contact with each other to completely prevent leakage of the pressure fluid through the discharge channel, assuring that the fluid chamber is completely independent of the filtrate discharge channel. Thus, the pressing fluid chamber and the filtering chamber are respectively kept sealed without employing a particular sealing structure for this portion. This serves to simplify the construction and reduce the manufacturing steps and assures safety squeezing operation.

Further in accordance with this invention wherein the airtight sheet is clamped at its peripheral portion, the arrangement to engage the sheet with the periphery of the core plate can be simplified remarkably.

The composite plates and single plates are arranged alternately side by side, with the filtering face of the single plate acting as a pressure resisting plane against the inflation of filtering face of the composite plate, so that the cake can be squeezed for more efficient removal of the liquid.

Other objects and features of this invention will become more apparent from the following description.

DESCRIPTION OF THE PREFERRED EMBODIMENT

Figure 1:
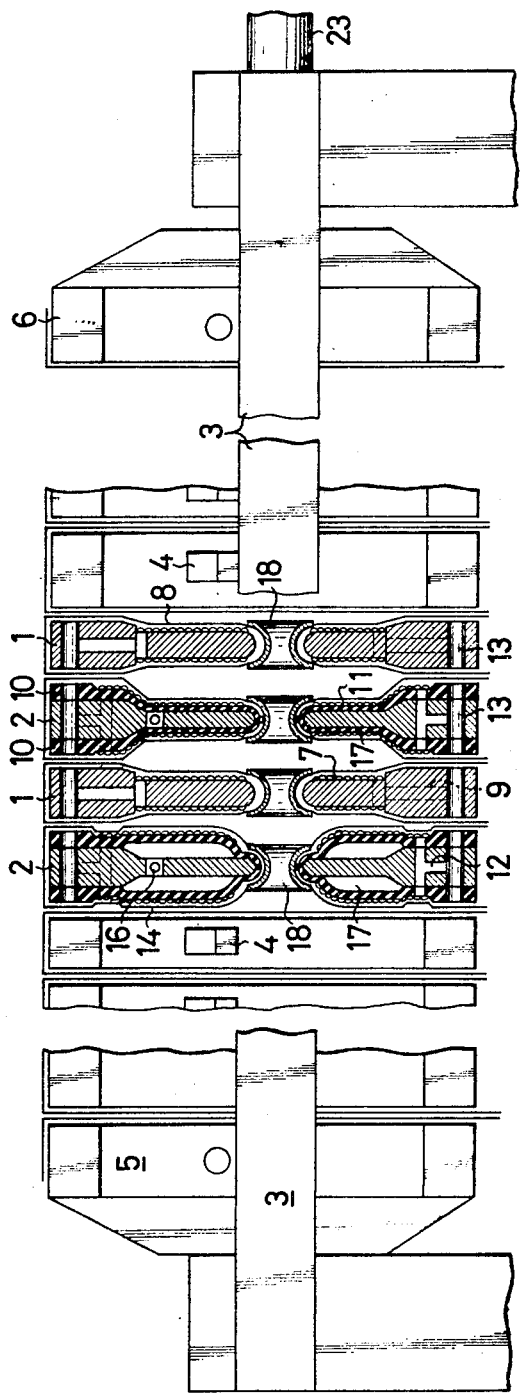
FIG. 1 is a side elevation showing an embodiment of this invention, the view being partly in section along the line I—I in FIG. 5.

The drawings show an embodiment wherein the present invention is applied to a filter press of the recessed-plate type having no filter frames and which comprises a great number of alternately arranged single filter plates 1 and composite filter plates 2 each composed of stretchable airtight sheets and a core plate. Each of the filter plates 1 and 2 is movably supported on side bars 3 secured to front and rear frames (not shown), with its opposite arms 4 hung on the side bars. A stationary end plate 5 and a movable end plate 6 are positioned in front and rear of the group of plates 1 and 2 respectively. The movable end plate 6 presses the plates against the stationary end plate 5 into contact with each other for filtration.

The single filter plate 1 has, along the peripheries of its front and rear faces, projecting edge 1a in the form of a picture frame. The recessed face of the plate 1 defined by the peripheral projecting edge 1a is studded with numerous pyramid-like protrusions 1c to provide a filtering face 1b formed with filtrate passages 7. A filter medium such as a sheet of fabric 8 is provided over the face of the filter plate. A filtrate discharge channel 9 extending through the single plate 1 has openings 9a in the filtering faces 1b.

The composite filter plate 2 includes a core plate 2a which is formed along the peripheries of its front and rear faces with projecting edges 2b corresponding to the projecting edges 1a of the single plate 1. Each face of the core plate 2a is thus surrounded by the projecting edge 2b to provide a recessed plane 2c. Each surface of the core plate 2a is covered with an airtight sheet 10 made of a stretchable material such as rubber and fitted to the peripheral edge 2b. The sheet has along the periphery of its surface a projecting edge 10a corresponding to the peripheral projecting edge 2b of the core plate 2a but having a smaller width. The inside face of the sheet 10 defined by the projecting edge 10a has numerous small pyramid-like protrusions 10c to form a filtering face 10b having filtrate passages 11. The core plate 2a is further formed in its peripheral projecting edge 2b a filtrate discharge channel 12 extending from the front face to the rear face. In a portion of filtering face of the sheet 10 where it is in fitting engagement with the projecting edge 2b, there is formed an opening 12a communicating with the filtrate discharge channel 12. As is the case with the single filter plate 1, the sheet 10 is covered with a filter medium such as a sheet of filter fabric 14.

The filtrate discharge channels 9 and 12 of the respective plates 1 and 2 communicate with a main filtrate discharge channel 13 formed in the side portions of the plates 1 and 2.

The core plate 2a of the composite filter plate 2 is further formed in its side portion with a pressure fluid supply channel 16 connected to a pressure fluid supply duct 15 and having an opening in the recessed plane 2c, the channel 16 communicating with a pressing fluid chamber 17 formed between the core plate 2a and the airtight sheet 10, the arrangement being such that a pressure fluid is supplied to the chamber 17 to inflate the sheet 10.

When positioned adjacent the single filter plate 1, the stationary end plate 5 and the movable end plate 6 are provided with the same construction as the composite filter plate 2 in their side faces opposing the single filter plate 1, or when adjacent the composite filter plate 2, the opposing side faces thereof are provided with the same construction as the filter plate 1.

Each of the filter plates 1 and 2 has a prefilt inlet 18 at a portion slightly below its center, and each of filtering chambers 19 formed between the filter plates 1 and 2 and between the filter plate 1 or 2 and the end plates 5, 6 is made to communicate with the prefilt inlet 18. An unillustrate prefilt charging duct is connected to one of the filtering chambers 19 by way of the stationary end plate 5 or the movable end plate 6 to supply a prefilt to the filtering chambers 19 through the prefilt inlets 18.

Figure 6:
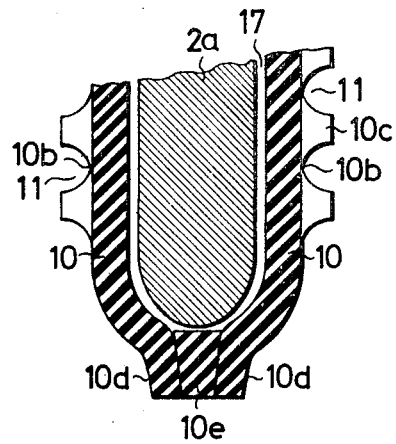
FIG. 6 is an enlarged sectional view showing part of the composite filter plate of FIG. 3.

The stretchable airtight sheets 10 over the opposite sides of the composite filter plate 2 have openings at the portion opposing the prefilt inlet 18, with the edges 10d of the opening extending into the prefilt inlet 18. The opening edges 10d of the front and rear sheets are joined together to ensure an airtight separation between the pressure fluid chamber 17 and the filtering chamber 19. To join the opening edges 10d of the sheets, for instance, there is provided between the opening edges 10d an annular member 10e of a similar material vulcanized to a higher degree and the edges and the annular member are heat-pressed to provide an integral joint as shown in FIG. 6.

Furthermore the sheets 8, 14 of the filter fabric extending over the surfaces of the plates 1 and 2 are formed with openings in corresponding relation to the prefilt inlets 18, and the peripheral edges of the openings are secured to and joined with the peripheries 20a of annular metal members 20 fitted in the prefilt inlets 18.

Wash liquor supply channels 21 and 22 are formed in the single filter plate 1 and the composite filter plate 2 respectively. These channels 21 and 22 have openings behind the sheets 8 and 14 of filter fabric. When desired, a wash liguor is supplied through the channels to wash the filter fabric.

For filtration, a cylinder 23 is operated to drive the movable end plate 6 toward the stationary end plate 5 to press the filter plates 1 and 2 together between the opposite end plates 5 and 6.

Figure 2:
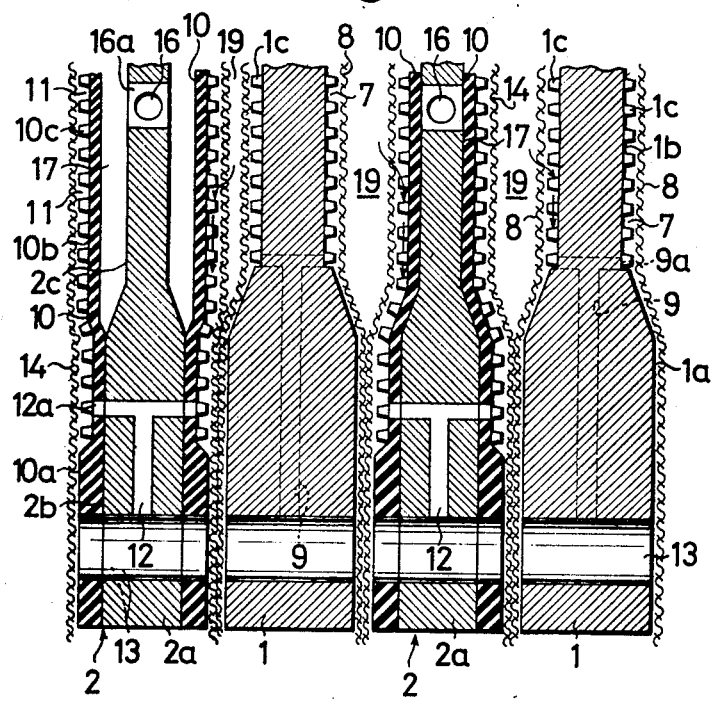
FIG. 2 is an enlarged view in section taken along the line II—II in FIG. 3 and showing the principal part.
Figure 3:
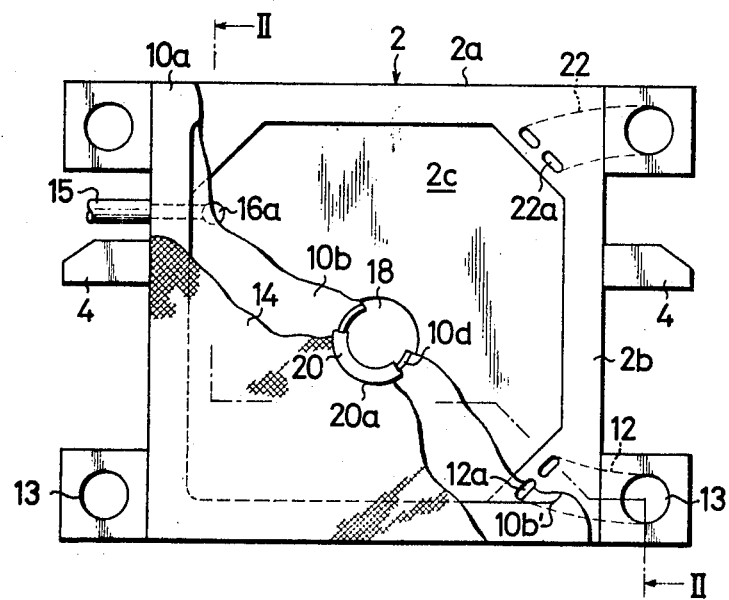
FIG. 3 is a front view with part broken away showing a composite filter plate.
Figure 4:
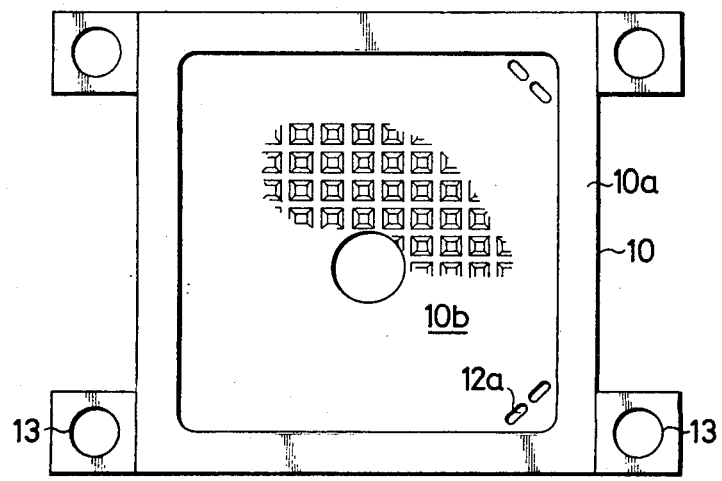
FIG. 4 is a front view showing an airtight rubber sheet of the composite filter plate shown in FIG. 3.
Figure 5:
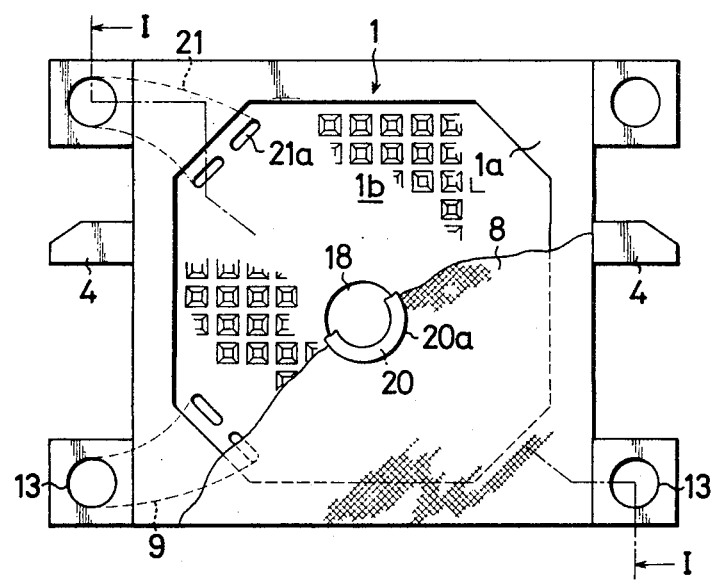
FIG. 5 is a front view with part broken away showing a single filter plate.

More specifically, when the movable end plate 6 is driven to clamp the filter plates 1 and 2 with the end plates 5 and 6, the peripheral projecting edge 1a of the single plate 1 and the peripheral projecting edge 2b of the core plate 2a press the peripheral portions of the airtight sheet 10 and the sheets 8 and 14 of filter fabric into contact with each other, so that irrespective of whether the airtight sheet 10 and the filter fabric sheets 8, 14 are in fitting engagement with the filter plate 1 or core plate 2a, the filtering chamber 19 between the plates 1 and 2 and the pressure fluid chamber 17 in the composite plate 2 are completely sealed independently of each other. Thus, when introduced into each filtering chamber 19, the prefilt is subjected to primary filtration to permit the resulting filtrate to flow along the filtering faces 1b and 10b as indicated by the arrow in FIG. 2, into the channels 9 and 12 through the openings 9a and 12a thereof and run out from the main filtrate discharge channel 13. The cake separated from the filtrate remains within the filtering chambers 19.

When a pressure fluid is supplied to the pressing fluid chamber 17 with the prefilt charging duct closed, the airtight sheet 10 is inflated to reduce the volume of the filtering chamber and squeeze the cake in the chamber. Thus the remaining liquid in the cake is discharged by the squeezing action to pass through the filter fabric and flow out from the main channel 13 by way of the channels 9 and 12. Although the pressure fluid supplied to the pressing fluid chamber 17 may act to separate the opening 12a of the airtight sheet 10 from the prefilt discharge channel 12 at this time, the pressure fluid will not reach the opening portion 12a to keep the pressing fluid chamber 17 independent of the filtering chamber 19 with reliability, since the airtight sheet 10 at the opening portion 12a is prevented from inflation by the end face of the projecting edge 1a of the adjacent single plate 1.

During the foregoing squeezing operation, a varying pressure may be imparted to the pressure fluid to thereby enhance the squeezing effect and prevent clogging of the fabric. For a similar reason, a pressure fluid may be supplied to the pressing fluid chamber with a varying pressure during the primary filtration to impart vibration to the prefilt for an improved filtering efficiency and prevention of clogging of the fabric.

When the liquid is removed from the cake, the pressure fluid is discharged from the pressing fluid chamber 17. The cylinder 23 is operated to retract the movable end plate 6 and the filter plates 1, 2 are moved one after another to permit the cake to drop or to force the same to drop from between the filter plates 1 and 2.

In place of the single filter plate 1, the composite filter plate 2 or a filter frame may be employed. In this case the frame may be of such form as resembling the peripheral edge 1a of the single filter plate 1 when viewed from the front.

Figure 7:
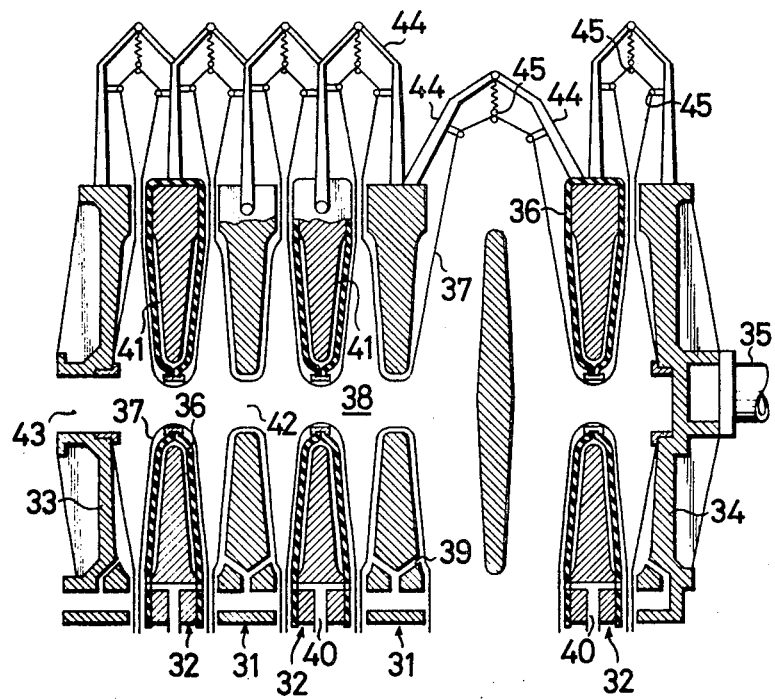
FIG. 7 is a view in vertical section showing the principal part of another embodiment of this invention.

FIG. 7 shows another embodiment of the present invention comprising alternately arranged single filter plates 31 and composite filter plates 32. A stationary end plate 33 and a movable end plate 34 are disposed at the opposite sides of the row of plates. For a filtering operation, the movable end plate 34 is operated by a cylinder 35 to press the group of the filter plates 31 and 32 against the stationary end plate 33. As in the foregoing embodiment, the single plates 31 and core plates of the composite plates 32 have peripheral projecting edges for clamping the peripheries of stretchable airtight sheets 36 and sheets of filter medium 37 when the plates are pressed together as above.

The single filter plate 31 has a filtrate discharge channel 39. The composite filter plate 32 has a filtrate discharge channel 40 having openings at portions where the stretchable airtight sheet 36 is prevented from swelling out and is provided with a duct (not shown) for supplying a pressure fluid to an pressing fluid chamber 41. As is the case with the embodiment of FIG. 1, filtering chambers 38 communicate with an unillustrated prefilt supply duct through openings 42 each formed slightly below the center of each of the filter plates 31 and 32 and through the opening 43 of the stationary end plate 33 for supply of a prefilt. Thus, this embodiment is essentially identical with the foregoing embodiment of FIG. 1. However, the filter plates 31 and 32 are hung on arms 44, with the filter medium 37 passed over pulleys 45 on the arms 44. As shown in the drawing, the arms 44 are pivotably connected together at their upper ends, and the arms 44 are opened to remove the cake after filtration. This facilitates spontaneous or forced dropping of the cake.

What is claimed is:

1. A recessed-plate filter press, comprising:
   A. a plurality of composite filter plates, movably supported on side bars secured to front and rear frames of said filter press, each comprising:
      1. a core plate having projecting edges, formed along the peripheries of both front and rear faces thereof, and a recessed plane, surrounded by said projecting edges, in each of said front and rear faces, comprising:
         a. a tranversely extending main filtrate discharge channel in a side portion of said core plate;
         b. a filtrate discharge channel extending from said front face to said rear face and communicating with said main filtrate discharge channel;
         c. a pressing fluid supply channel connected to a pressing fluid supply duct and having an opening in each of said planes; and
         d. a centrally disposed prefilt inlet which extends transversely between said front and rear planes, and
      2. a pair of air-tight, stretchable sheets, each sheet being fitted to said projecting edges of each of said front and rear faces in sealing engagement therewith and forming a pressing fluid chamber between each of said planes and each of said sheets, whereby pressing fluid, entering said pressing fluid chambers through said supply channels, inflates said stretchable sheets away from said front and rear planes, each stretchable sheet comprising:
         a. an inside facing having numerous small pyramid-like protrusions to form a filtering face having filtrate passages therebetween, when said inside face is covered with a filter fabric;
         b. an opening therethrough which is aligned with said filtrate discharge channel, whereby said filtrate passages communicate with said opening and with said filtrate discharge channel; and c. a centrally disposed opening which is aligned with said prefilt inlet, said pair of stretchable sheets being joined together at the edges of said opening by an annular member which is fitted within said prefilt opening in said core plate.

B. a plurality of intermediate plates, movably supported on said side bars, arranged alternately with said composite plates, and having projecting edges along the peripheries thereof which mate in sealing engagement with the projecting edges of said stretchable sheet when a filter fabric is therebetween, comprising a centrally disposed prefilt inlet which is aligned with said prefilt inlets of said composite filter plates to provide an unobstructed prefilt entrance passage; and C. a pair of filter fabrics for use with each composite plate, having a centrally disposed opening with the peripheries thereof secured to and joined with the peripheries of an annular metal member which is fitted within said annular member of said stretchable sheets, and forming a filtering chamber in communication with said prefilt inlets, whereby said main filtrate discharge channels in said aligned and alternately arranged core plates and single plates provide an unobstructed filtrate discharge passage and said filtering chambers retain a plurality of filtering cakes which are squeezed between adjacent filter fabrics when said pressing fluid is charged into said pressing fluid chambers.

2. The recessed-plate filter press of claim 1 wherein said intermediate plates are single plates, each of said single plates further comprising:

A. a recessed face on each side thereof which is surrounded by said projecting edges, having numerous pyramid-like protrusions which provide a filtering face formed with filtrate passages therebetween;

B. a transversely extending main filtrate discharge channel in a side portion of said single plate which is aligned with and in communication with said main discharge channel in said core plate; and C. a filtrate discharge channel extending between said recessed faces and communicating with said main filtrate discharge channel and with said filtrate passages.

3. The recessed-plate filter press of claim 2 wherein each of said single plates is further provided with a pair of said filter fabrics covering said recessed faces and having said annular metal member thereof fitted within said prefilt inlet of said single plate, whereby said annular metal members within said prefilt inlets of said alternately arranged composite plates and single plates are aligned to provide an unobstructed prefilt entrance passage and said filtering chambers are formed between opposed filter fabrics of adjacent pairs thereof covering adjacent composite plates and single plates.

* * * * *